United States Patent
Hirokubo et al.

(10) Patent No.: US 9,046,679 B2
(45) Date of Patent: Jun. 2, 2015

(54) WAVELENGTH VARIABLE INTERFERENCE FILTER, OPTICAL SENSOR, ANALYZER AND PROCESS FOR PRODUCING WAVELENGTH VARIABLE INTERFERENCE FILTER

(75) Inventors: Nozomu Hirokubo, Fujimi (JP); Seiji Yamazaki, Fujimi (JP)

(73) Assignee: Seiko Epson Corporation (JP)

( * ) Notice: Subject to any disclaimer, the term of this patent is extended or adjusted under 35 U.S.C. 154(b) by 955 days.

(21) Appl. No.: 12/983,469

(22) Filed: Jan. 3, 2011

(65) Prior Publication Data

US 2011/0194118 A1 Aug. 11, 2011

(30) Foreign Application Priority Data

Feb. 10, 2010 (JP) .................................. 2010-027322

(51) Int. Cl.
*G01J 3/45* (2006.01)
*G02B 26/00* (2006.01)
*B32B 37/02* (2006.01)
*B32B 38/10* (2006.01)
*B32B 37/12* (2006.01)
*G02B 5/28* (2006.01)

(52) U.S. Cl.
CPC .............. *G02B 26/001* (2013.01); *B32B 37/02* (2013.01); *B32B 37/12* (2013.01); *B32B 38/10* (2013.01); *B32B 2309/105* (2013.01); *B32B 2551/00* (2013.01); *G02B 5/284* (2013.01)

(58) Field of Classification Search
USPC .......................................... 356/454; 359/260
See application file for complete search history.

(56) References Cited

U.S. PATENT DOCUMENTS

| | | | | |
|---|---|---|---|---|
| 4,324,475 A * | 4/1982 | Purdie | ........................... | 356/519 |
| 4,525,067 A * | 6/1985 | Hernandez | ..................... | 356/454 |
| 5,909,280 A * | 6/1999 | Zavracky | ....................... | 356/454 |
| 7,304,800 B2 | 12/2007 | Nakamura et al. | | |
| 2005/0007933 A1 * | 1/2005 | Yoda | ........................ | 369/112.22 |

FOREIGN PATENT DOCUMENTS

JP 2005-165067 6/2005

* cited by examiner

*Primary Examiner* — Tarifur Chowdhury
*Assistant Examiner* — Jonathon Cook
(74) *Attorney, Agent, or Firm* — Harness, Dickey & Pierce, P.L.C.

(57) ABSTRACT

A wavelength variable interference filter includes: a first substrate which has a light transmissive property; a second substrate which has a light transmissive property and is disposed to face one surface of the first substrate and is bonded thereto; a first reflection film which is provided on the first substrate; a second reflection film which is provided on the second substrate; and a variable section which varies the gap; wherein the second substrate includes: a first layer which has a movable section; and a second layer which is laminated to a surface of the first layer facing the first substrate, is formed in a plate shape with a uniform thickness, and has a support section configured to displaceably support the movable section; and the first layer is not laminated to at least a region overlapping with the support section in the planar view.

8 Claims, 6 Drawing Sheets

WAVELENGTH VARIABLE INTERFERENCE FILTER, OPTICAL SENSOR, ANALYZER AND PROCESS FOR PRODUCING WAVELENGTH VARIABLE INTERFERENCE FILTER

BACKGROUND

1. Technical Field

The present invention relates to a wavelength variable interference filter and a process for producing a wavelength variable interference filter.

2. Related Art

In the past, a wavelength variable interference filter having a pair of high-reflection mirrors disposed to face each other on the facing surfaces of a pair of substrates, respectively, was known. In such a wavelength variable interference filter, light is reflected between the pair of mirrors and only light of a specific wavelength is transmitted, and light of other wavelengths is canceled by interference, thereby transmitting only light of a specific wavelength among incident light.

For example, in an electrostatic-driven wavelength variable interference filter described in JP-A-2005-165067, due to an electrostatic attractive force generated between driving electrodes provided on the facing surfaces of a pair of substrates, respectively, a support section (diaphragm) is deformed, thereby varying a gap between a pair of mirrors. A movable section of the substrate provided with a second reflection film (movable mirror) is formed such that the thickness thereof is large so as to prevent the movable mirror from bending.

In the wavelength variable interference filter described in JP-A-2005-165067, the substrate provided with the movable section and the support section is formed by etching a sheet of substrate, however, it is necessary to make the thickness of the substrate before etching large for making the thickness of the movable section large. However, when the thickness of the substrate is large, it is necessary to perform etching for a long time for forming the support section and also a variation in the thickness of the support section is increased due to a variation in etching. In this case, the pair of mirrors cannot be maintained in a parallel state when displacing the movable section, and therefore, there was a problem of a deterioration in spectroscopic accuracy such as a decrease in resolution of light dispersed by the wavelength variable filter.

SUMMARY

An advantage of some aspects of the invention is to provide a wavelength variable interference filter capable of maintaining high spectroscopic accuracy and a process for producing a wavelength variable interference filter.

A wavelength variable interference filter according to an aspect of the invention includes: a first substrate which has a light transmissive property; a second substrate which has a light transmissive property and is disposed to face one surface of the first substrate and is bonded thereto; a first reflection film which is provided on the first substrate; a second reflection film which is provided on the second substrate and faces the first reflection film with a gap interposed therebetween; and a variable section which varies the gap. The second substrate includes: a first layer which has a movable section provided at a position overlapping with the second reflection film in a planar view seen in the direction of the thickness of the second substrate; and a second layer which is laminated to a surface of the first layer facing the first substrate, is formed in a plate shape with a uniform thickness, and has a support section configured to displaceably support the movable section, and the first layer is not laminated to at least a region overlapping with the support section in the planar view.

According to the aspect of the invention, in the first layer of the second substrate, the movable section is formed, and in the second layer, the support section having a uniform thickness is formed. Further, in the second substrate, the first layer is not laminated to at least a region overlapping with the support section of the second layer (support section region) in the planar view. Here, the phrase "the first layer is not laminated to the support section region" refers to a state where the movable section and the like that constitute the first layer are not formed in the support section region and the support section region is formed only of the second layer, or a state where the support section region is formed by laminating, for example, an optical adhesive or the like that bonds the first layer to the second layer and the second layer to each other.

In such a configuration, on the support section of the second layer, the first layer is not laminated, and the thickness of the support section is determined by the thickness of the second layer. Here, according to the aspect of the invention, the second layer is formed in a plate shape with a uniform thickness, and therefore, the thickness of the support section is also uniform. Accordingly, when the movable section is displaced, a bending stress is uniformly applied to the support section, and therefore, the support section can be bent in a well-balanced manner and the movable section can be displaced while maintaining the state where the fist reflection film and the second reflection film are in parallel to each other. Consequently, even when the movable section is displaced, a disadvantage such as a decrease in wavelength resolution of transmitted light does not occur and high spectroscopic accuracy can be maintained.

In the wavelength variable interference filter according to the aspect of the invention, it is preferred that the first layer and the second layer are formed of glass and bonded to each other through a bonding layer, and the bonding layer is formed of an epoxy resin or an amorphous fluororesin.

In this configuration, the bonding layer is formed of an epoxy resin or an amorphous fluororesin which can firmly bond glass members. Therefore, the bonding strength between the first layer and the second layer is increased, and peeling of the movable section can be prevented when, for example, the support section of the second layer bends.

Another aspect of the invention is directed to a process for producing a wavelength variable interference filter, which includes: a first substrate which has a light transmissive property; a second substrate which has a light transmissive property and is disposed to face one surface of the first substrate and is bonded thereto; a first reflection film which is provided on the first substrate; a second reflection film which is provided on the second substrate and faces the first reflection film with a gap interposed therebetween; and a variable section which varies the gap. A process for producing the second substrate includes: a laminating step of laminating and bonding a first layer base material for forming a first layer which has a movable section formed at a position overlapping with the second reflection film in a planar view seen in the direction of the thickness of the second substrate to a second layer base material for forming a second layer which is formed in a plate shape with a uniform thickness and has a support section configured to displaceably support the movable section; and a first layer forming step of removing at least a region of the first layer base material overlapping with a region where the support section is formed while leaving the movable section at a position overlapping with the position where the second reflection film is formed in the planar view.

According to the aspect of the invention, in the first layer forming step, the first layer is formed by removing the first layer base material in a region overlapping with the support section (support section-overlapping region) while leaving at least the movable section. Accordingly, the first layer base material does not remain on the support section of the second layer, and therefore, the thickness of the support section does not vary and can be made uniform. Further, in the resulting wavelength variable interference filter, the movable section of the first layer is supported by the support section formed to have a uniform thickness, and therefore, when the movable section is displaced, the support section can be bent in a well-balanced manner, and the spectroscopic accuracy can be maintained high.

The adjustment of the thickness of the support section of the second layer is performed by laminating and bonding the second layer base material in a plate shape previously formed to have a desired thickness of the support section to the first layer base material or by bonding the first layer base material to the second layer base material, and thereafter processing the second layer base material to a desired thickness of the support section by grinding, etching, or the like.

In the process for producing a wavelength variable interference filter according to the aspect of the invention, it is preferred that in the first layer forming step, the first layer base material is removed by blasting.

In this configuration, the first layer base material is excavated to a desired thickness by blasting by which the speed of removing the first layer base material is higher than the case of using etching, and therefore, the time required for the first layer forming step can be reduced as compared with the case where the first layer base material is removed only by etching.

Further, since the speed of excavation by blasting is high, even in the case where the thickness of the movable section is increased using the first layer base material having a large thickness, the time required for the first layer forming step can be reduced. Accordingly, in the thus produced wavelength variable interference filter, the thickness of the movable section is large, and therefore, the second reflection film can be more effectively prevented from bending.

In the process for producing a wavelength variable interference filter according to the aspect of the invention, it is preferred that in the first layer forming step, after removing a portion of the first layer base material halfway by blasting, the rest of the first layer base material is removed by etching.

In this configuration, after removing the first layer base material halfway by blasting, the rest is removed by etching, and therefore, the first layer base material can be uniformly removed as compared with the case where all of the first layer base material is removed by blasting. That is, in the case where the first layer base material is removed only by blasting, when the timing of stopping the blasting is early, the first layer base material remains on the support section (support section-overlapping region), and due to the residual components, a bending stress is not uniformly applied to the support section, and therefore, the support section may not be able to be bent in a well-balanced manner. Meanwhile, when the timing of stopping the blasting is late, the second layer base material is also excavated, and the thickness of the support section may not be uniform. On the other hand, according to the aspect of the invention, after a portion of the first layer base material is rapidly removed by blasting, the rest is removed by etching, and therefore, etching accuracy can be increased, and the first layer base material can be prevented from remaining and the second layer base material can be prevented from being excavated.

In the process for producing a wavelength variable interference filter according to the aspect of the invention, it is preferred that the first layer and the second layer are formed of glass, and in the laminating step, the first layer base material and the second layer base material are bonded to each other through a bonding layer formed of an epoxy resin or an amorphous fluororesin.

In this configuration, since the bonding layer is interposed between the first layer base material and the second layer base material, when the first layer base material is removed by blasting or etching, the second layer base material can be prevented from being removed. Accordingly, a variation in the thickness of the support section can be decreased.

Here, the bonding layer is formed of an epoxy resin or an amorphous fluororesin, which is hardly etched with hydrogen fluoride. Therefore, when the first layer base material in the support section region is removed by etching through wet etching, this bonding layer functions as an etching stopping layer. Accordingly, when etching a region overlapping with the support section of the first layer base material, the first layer base material on the support section can be removed reliably and easily, and therefore, the production process can be simplified.

In addition, the bonding layer is formed of an epoxy resin or an amorphous fluororesin which can firmly bond glass members. Therefore, the bonding strength between the first layer and the second layer is increased, and peeling of the movable section can be prevented when, for example, the first substrate and the second substrate are bonded or when the support section of the second layer bends.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, a colorimetric module having a wavelength variable interference filter according to one embodiment of the invention will be described with reference to the accompanying drawings.

1. Overall Configuration of Colorimetric Module

Figure 1:
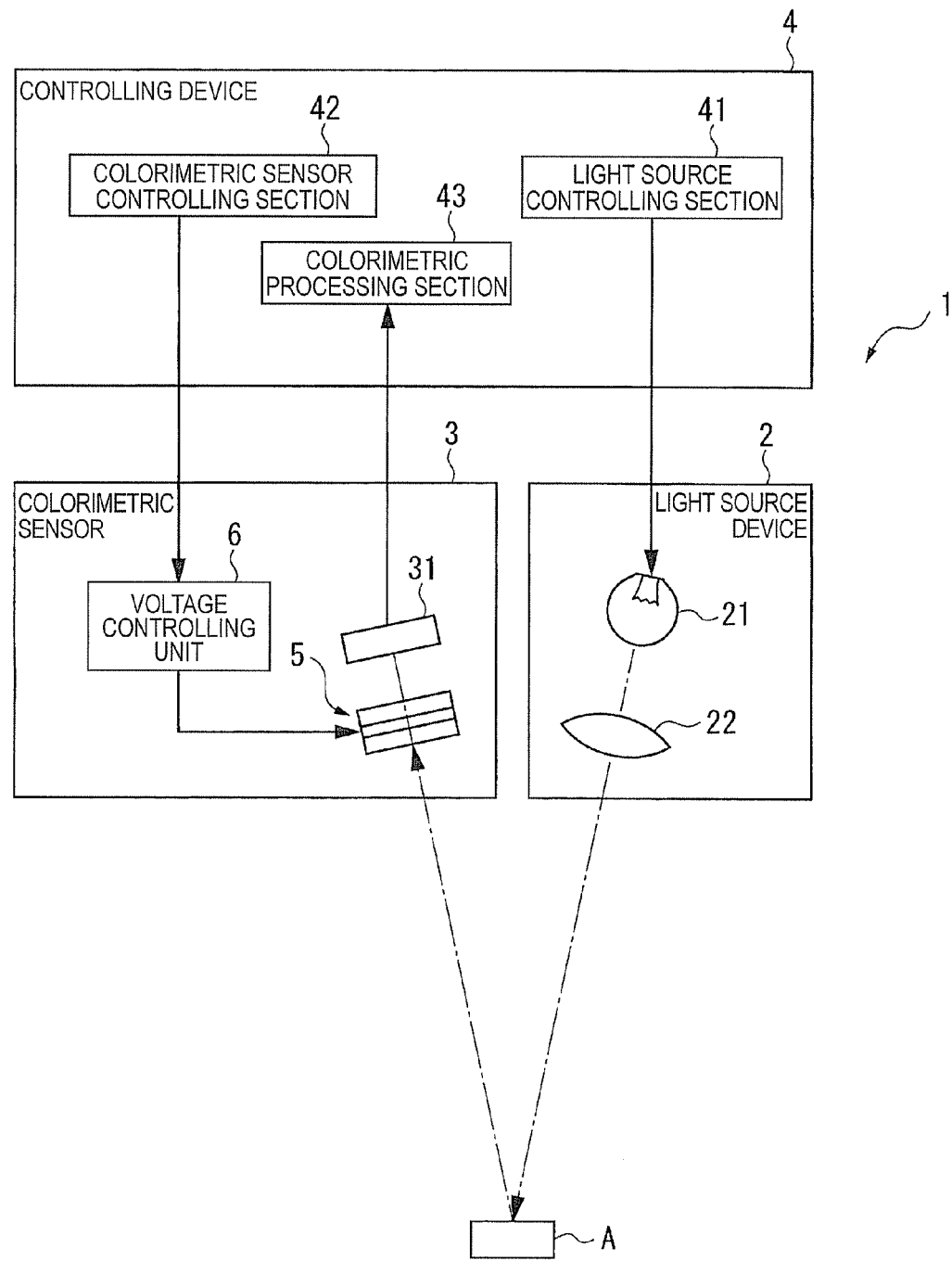
FIG. 1 is a view showing a schematic configuration of a colorimetric module having a wavelength variable interference filter according to one embodiment of the invention.

FIG. 1 is a view showing a schematic configuration of a colorimetric module having a wavelength variable interference filter according to one embodiment of the invention.

As shown in FIG. 1, a colorimetric module 1 is provided with a light source device 2 which emits light to a test subject A, a colorimetric sensor 3 according to the invention, and a controlling device 4 which controls the overall operation of the colorimetric module 1. This colorimetric module 1 is configured such that light emitted from the light source device 2 is reflected by the test subject A, the colorimetric sensor 3 receives the reflected light to be tested, and the chromaticity of the light to be tested, i.e., the color of the test subject A is analyzed and measured based on a detection signal output from the colorimetric sensor 3.

2. Configuration of Light Source Device

The light source device 2 is provided with a light source 21 and a plurality of lenses 22 (only one lens is shown in FIG. 1) and emits white light to the test subject A. Further, the plurality of lenses 22 include a collimator lens, and the light source device 2 causes the collimator lens to convert the white light emitted from the light source 21 to parallel light, and emits the parallel light from a projection lens (not shown) to the test subject A.

3. Configuration of Colorimetric Sensor

As shown in FIG. 1, the colorimetric sensor 3 is provided with an etalon 5 constituting a wavelength variable interference filter according to the invention, a light receiving device 31 serving as a light receiving unit which receives light transmitted through the etalon 5, and a voltage controlling unit 6 which can vary the wavelength of light to be transmitted through the etalon 5. Further, the calorimetric sensor 3 is provided with an incident optical lens (not shown) which guides the light (light to be detected) reflected by the test subject A inside at a position facing the etalon 5. Then, this colorimetric sensor 3 causes the etalon 5 to disperse only light of a given wavelength among the light to be tested incident from the incident optical lens, and causes the light receiving device 31 to receive the dispersed light.

The light receiving device 31 is composed of a plurality of photoelectric conversion elements and produces an electrical signal in accordance with the amount of light received. Further, the light receiving device 31 is connected to the controlling device 4 and outputs the produced electrical signal to the controlling device 4 as a light receiving signal.

3-1. Configuration of Etalon

Figure 2:
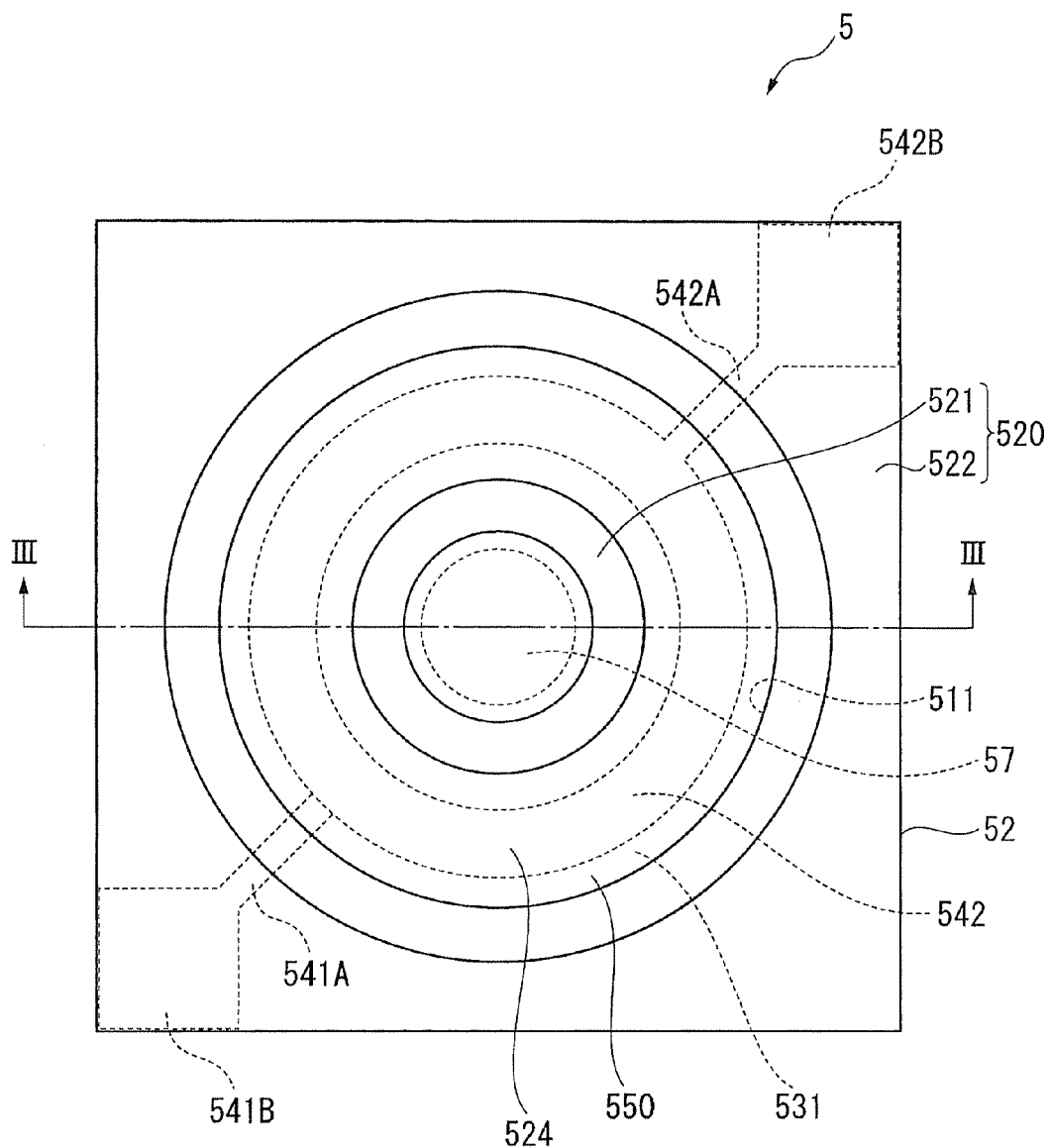
FIG. 2 is a plan view showing a schematic configuration of an etalon constituting the wavelength variable interference filter according to the embodiment.
Figure 3:
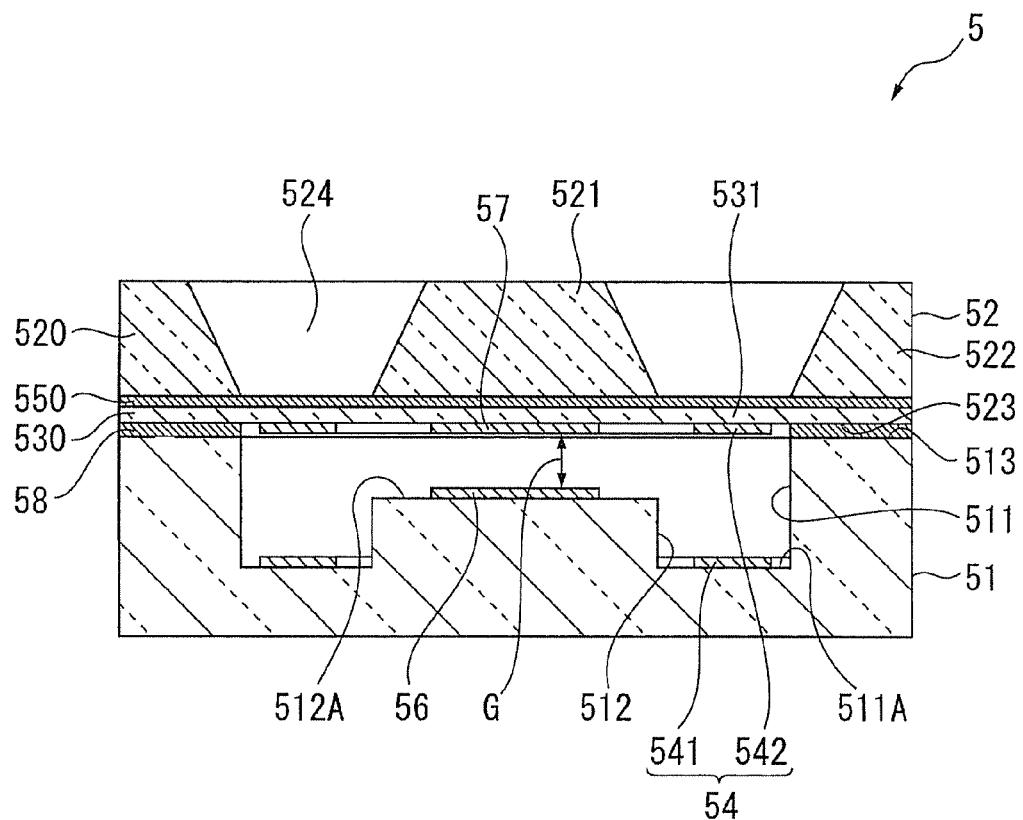
FIG. 3 is a cross-sectional view of the etalon viewed along arrows III-III in FIG. 2.

FIG. 2 is a plan view showing a schematic configuration of the etalon 5 constituting a wavelength variable interference filter according to the invention, and FIG. 3 is a cross-sectional view showing a schematic configuration of the etalon 5. Incidentally, in FIG. 1, the light to be tested is incident to the etalon 5 from the lower side of the drawing, and in FIG. 3, the light to be tested is incident to the etalon 5 from the upper side of the drawing.

As shown in FIG. 2, the etalon 5 is a square planar plate-shaped optical member with a side of, for example, 10 mm. As shown in FIG. 3, this etalon 5 is provided with a first substrate 51 and a second substrate 52. These two substrates 51 and 52 are each formed of any of various types of glass such as soda glass, crystalline glass, quartz glass, lead glass, potassium glass, borosilicate glass, and alkali-free glass, quartz, or the like. Among these materials, as the constituent material of each of the substrates 51 and 52, glass containing an alkali metal such as sodium (Na) or potassium (K) is preferred. The formation of each of the substrates 51 and 52 using such glass can improve the adhesion thereof to the below-mentioned mirrors 56 and 57, and also to each electrode, and the bonding strength between the substrates. Further, these two substrates 51 and 52 are bonded to each other at bonding surfaces 513 and 523 formed in the vicinity of the outer periphery and are integrally formed. In the etalon 5, the substrates 51 and 52 are bonded through a plasma-polymerized film 58.

A pair of mirrors 56 and 57 are provided between the first substrate 51 and the second substrate 52. On the first substrate 51, a fixed mirror 56 is provided as a first reflection film, and on the second substrate 52, a movable mirror 57 is provided as a second reflection film. Here, the fixed mirror 56 is fixed on a surface of the first substrate 51 facing the second substrate 52, and the movable mirror 57 is fixed on a surface of the second substrate 52 facing the first substrate 51. Further, the fixed mirror 56 and the movable mirror 57 are disposed to face each other with an inter-mirror gap G interposed therebetween. The fixed mirror 56 and the movable mirror 57 will be described in detail later.

Further, between the first substrate 51 and the second substrate 52, an electrostatic actuator 54 configured to adjust the dimension of the inter-mirror gap G between the fixed mirror 56 and the movable mirror 57.

3-1-1, Configuration of First Substrate

The first substrate 51 is formed by processing a glass base material having a thickness of, for example, 500 μm by etching. Specifically, as shown in FIG. 3, in the first substrate 51, an electrode forming groove 511 and a mirror fixing section 512 are formed by etching.

The electrode forming groove 511 is formed in a circular shape using the center point of the plane as the center thereof in a planar view when viewing the etalon 5 in the thickness direction (hereinafter referred to as "etalon planar view") as shown in FIG. 2. The mirror fixing section 512 is formed protruding from a center portion of the electrode forming groove 511 to the side of the second substrate 52 as shown in FIG. 3.

Further, in the first substrate 51, a groove is formed at a position where the below-mentioned first displacement electrode pad 541B is formed. Further, in the first substrate 51, a groove is formed also at a position facing the below-mentioned second displacement electrode pad 542B of the second substrate 52.

In the electrode forming groove 511, a ring-shaped electrode fixing surface 511A is formed between the outer periphery of the mirror fixing section 512 and the inner peripheral wall surface of the electrode forming groove 511, and on the electrode fixing surface 511A, the first displacement electrode 541 is formed. Further, from a portion of the outer periphery of the first displacement electrode 541, a first displacement electrode drawing section 541A is formed extending in the direction of the lower-left of the etalon 5 in the etalon planar view as shown in FIG. 2. Further, at the tip of the first displacement electrode drawing section 541A, the first displacement electrode pad 541B is formed and connected to the voltage controlling unit 6. Incidentally, in the first substrate 51, the groove is formed so that the first displacement electrode drawing section 541A and the first displacement electrode pad 541B can be formed therein and the groove continues to the electrode forming groove 511. Further, in the first substrate 51, a groove is formed also at a position facing the below-mentioned second displacement electrode pad 542B to be formed in the second substrate 52. These grooves can be utilized as spaces for lines or the like for connecting the first displacement electrode pad 541B or the second displacement electrode pad 542B to the voltage controlling unit 6.

Here, when the electrostatic actuator 54 is driven, a voltage is applied to the first displacement electrode pad 541B by the voltage controlling unit 6.

Incidentally, in this embodiment, an example in which one first displacement electrode pad 541B is formed for the first displacement electrode 541 is described, however, the invention is not limited thereto, and for example, a configuration in which another first displacement electrode drawing section 541A and another first displacement electrode pad 541B extending in the lower-right direction in the etalon planar view shown in FIG. 2 are formed may be employed. In this case, one of the two first displacement electrode pads 541B may be used as a voltage application terminal for applying a voltage to the first displacement electrode 541 and the other may be used as a charge detection terminal for detecting a charge retained by the first displacement electrode 541.

The mirror fixing section 512 is, as described above, formed concentrically with the electrode forming groove 511 and has a cylindrical shape with a diameter smaller than that of the electrode forming groove 511. Incidentally, in this embodiment, as shown in FIG. 3, an example in which a mirror fixing surface 512A of the mirror fixing section 512 facing the second substrate 52 is formed closer to the second substrate 52 than the electrode fixing surface 511A is described, however, the invention is not limited thereto. The levels of the electrode fixing surface 511A and the mirror fixing surface 512A are appropriately determined according to the dimension of the inter-mirror gap G between the fixed mirror 56 to be fixed to the mirror fixing surface 512A and the movable mirror 57 to be formed on the second substrate 52, the dimension between the first displacement electrode 541 and the below-mentioned second displacement electrode 542 to be formed on the second substrate 52, and the thicknesses of the fixed mirror 56 and the movable mirror 57, and the invention is not limited to the configuration described above. For example, in the case where dielectric multilayer film mirrors are used as the mirrors 56 and 57, and the thicknesses thereof are increased, a configuration in which the electrode fixing surface 511A and the mirror fixing surface 512A are formed on the same plane; a configuration in which a mirror fixing groove in a cylindrical concave shape is formed in a center part of the electrode fixing surface 511A and the mirror fixing surface 512A is formed on the bottom surface of this mirror fixing groove; or the like may be employed.

In addition, it is preferred that the depth of the groove of the mirror fixing surface 512A of the mirror fixing section 512 is designed by also considering the wavelength range of light to be transmitted through the etalon 5. For example, in this embodiment, in the case where an initial value of the inter-mirror gap G between the fixed mirror 56 and the movable mirror 57 (the dimension of the inter-mirror gap G when a voltage is not applied between the first displacement electrode 541 and the second displacement electrode 542) is set to 450 nm and then, a voltage is applied between the first displacement electrode 541 and the second displacement electrode 542, the movable mirror 57 can be displaced until the inter-mirror gap G reaches, for example, 250 nm. In this manner, by varying the voltage between the first displacement electrode 541 and the second displacement electrode 542, it becomes possible to selectively disperse and transmit light of a wavelength in the entire visible light range. In this case, the dimensions such as the film thicknesses of the fixed mirror 56 and the movable mirror 57, the levels of the mirror fixing surface 512A and the electrode fixing surface 511A may be set to values which can vary the inter-mirror gap G in the range between 250 nm and 450 nm.

Further, to the mirror fixing surface 512A, the fixed mirror 56 to be formed in a circular shape with a diameter of about 3 mm is fixed. This fixed mirror 56 is a mirror made of an AgC single-layer and is formed on the mirror fixing surface 512A by sputtering or the like. Further, the AgC single-layer mirror is formed to have a thickness of, for example, 0.03 μm.

Incidentally, in this embodiment, an example in which the AgC single-layer mirror capable of covering the entire visible light range as the range of the wavelength of light which can be dispersed by the etalon 5 is used as the fixed mirror 56 is described, however, the invention is not limited thereto. For example, it may be configured to use a $TiO_2$—$SiO_2$ dielectric multilayer film mirror having a small range of the wavelength of light which can be dispersed by the etalon 5, but having higher transmittance of light dispersed, smaller half-width of transmittance, and higher resolution than the AgC single-layer mirror. However, in this case, as described above, it is necessary to appropriately determine the level of the mirror fixing surface 512A or the electrode fixing surface 511A of the first substrate 51 according to the thickness of the fixed mirror 56 or the movable mirror 57, the selected range of the wavelength of light to be dispersed, or the like.

Further, the first substrate 51 has an anti-reflection film (AR) (not shown) formed at a position corresponding to the fixed mirror 56 on the lower surface thereof on the opposite side of the upper surface facing the second substrate 52. This anti-reflection film is formed by alternately laminating a low refractive index film and a high refractive index film and has functions to decrease the reflectance of visible light on the surface of the first substrate 51, thereby increasing the transmittance thereof.

3-1-2. Configuration of Second Substrate

The second substrate 52 is a laminated body in which a first layer 520 and a second layer 530 are bonded to each other through a bonding layer 550. The second substrate 52 is bonded to the first substrate 51 such that the second layer 530 faces the first substrate 51. The first layer 520 and the second layer 530 are each formed of a member having a light transmissive property, and in the etalon 5, these layers are formed by processing glass base materials serving as a first layer base material and a second layer base material, respectively. The thicknesses of these glass base materials are appropriately determined according to the size of the etalon 5, the displaceable amount of the inter-mirror gap G with respect to the selected range of the wavelength of light to be dispersed, the processing time when producing the second substrate 52, and the like. In this embodiment, the thickness of the glass base material serving as the first layer base material is, for example, from 200 μm to 1 mm, and by processing such a glass base material by cutting, grinding, or the like, the first layer 520 is formed such that the thicknesses of a movable section and a shoulder section, which will be described later, are, for example, 500 μm, respectively. Further, the thickness of the glass base material serving as the second layer base material is, for example, from 100 μm to 200 μm, and by processing such a glass base material by cutting, grinding, or the like, the second layer 530 is formed to a thickness of, for example, 50 μm.

The first layer 520 is provided with a movable section 521 in a circular shape using the center point of the substrate as the center thereof in a planar view as shown in FIG. 2. Further, the movable section 521 is in a trapezoidal shape in a cross-sectional view as shown in FIG. 3. This movable section 521 prevents the movable mirror 57 from bending.

Further, the first layer 520 is provided with a shoulder section 522 as shown in FIG. 3 at an outer peripheral end portion.

The movable section 521 and the shoulder section 522 are formed by removing the glass base material serving as the first layer base material while leaving regions in which the movable section 521 and the shoulder section 522 are formed.

A region in which this first layer base material has been removed corresponds to a region overlapping with the below-mentioned support section 531 (a support section region 524) in the etalon planar view. As shown in FIG. 3, in the support section region 524, the movable section 521 or the shoulder section 522, both of which constitute the first layer 520, is not laminated, and only the support section 531 and the bonding layer 550 located on the support section 531 are provided.

The movable section 521 and the shoulder section 522 are formed such that the thicknesses thereof are larger than that of the below-mentioned support section 531. For example, in this embodiment, the movable section 521 and the shoulder section 522 are formed to a thickness of 500 μm, which is the same as that of the glass base material serving as the first layer base material. In this case, the thickness of the glass base material serving as the first layer base material is set to 500 μm or more, and the glass base material may be processed by etching such that the thicknesses of the movable section 521 and the shoulder section 522 are 500 μm, respectively.

The movable section 521 has an anti-reflection film (AR) (not shown) formed at a position corresponding to the movable mirror 57 on the upper surface thereof on the opposite side of the surface to be bonded to the second layer 530. This anti-reflection film has the same configuration as that of the anti-reflection film to be formed on the first substrate 51 and is formed by alternately laminating a low refractive index film and a high refractive index film.

The shoulder section 522 is formed along the outer periphery of the first layer 520 and has a function to increase the strength of the etalon 5.

As described above, a groove is formed on the side of the first substrate 51 facing the below-mentioned second displacement electrode pad 542B. Therefore, a region at a position where the second displacement electrode pad 542B is formed is not bonded to the first substrate 51 since the groove is present there. If the shoulder section 522 is not formed on the side of the first layer 520 at the position where the second displacement electrode pad 542B is formed, the second displacement electrode pad 542B is to be supported by the second layer 530 which is thinner than the first layer 520. If so, the strength of the region where the second displacement electrode pad 542B is formed is low, and, for example, breakage may occur when the second displacement electrode pad 542B is connected to the voltage controlling unit 6. In addition, the outer peripheral region of the substrate is more liable to be affected by an external force than the central region thereof, and therefore, breakage may occur by an impact even in normal use. By forming the shoulder section 522, breakage can be prevented.

The second layer 530 is formed in a plate shape with a uniform thickness. Further, a region of the second layer 530 facing the support section region 524 of the first layer 520 functions as the support section 531 which has the same axis as the movable section 521 and displaceably supports the movable section 521. In the etalon 5, the second layer 530 supports the movable section 521 and the shoulder section 522. The support section 531 surrounds the periphery of the movable section 521 and displaceably supports the movable section 521 and functions as a diaphragm. In this embodiment, a configuration in which a portion of the second layer 530 in a plate shape with a uniform thickness is allowed to function as the support section 531 is employed, however, for example, a configuration in which the support section 531 with a uniform thickness is formed by processing a portion of the glass base material serving as the second layer base material by cutting, grinding, or the like may be employed.

On the surface of the support section 531 facing the first substrate 51, a ring-shaped second displacement electrode 542 which faces the first displacement electrode 541 with an electrode gap of about 1 μm is formed.

From a portion of the outer periphery of the second displacement electrode 542, a second displacement electrode drawing section 542A is formed extending in the direction of the outer periphery, and at the tip of the second displacement electrode drawing section 542A, the second displacement electrode pad 542B is formed. More specifically, the second displacement electrode drawing section 542A is formed extending in the direction of the upper-right of the etalon 5 in the etalon planar view as shown in FIG. 2.

Further, the second displacement electrode pad 542B is also connected to the voltage controlling unit 6 in the same manner as the first displacement electrode pad 541B, and a voltage is applied to the second displacement electrode pad 542B when the electrostatic actuator 54 is driven.

Incidentally, in this embodiment, an example in which one second displacement electrode pad 542B is formed for the second displacement electrode 542 is described, however, the invention is not limited thereto, and for example, a configuration in which another second displacement electrode drawing section 542A and another second displacement electrode pad 542B extending in the upper-left direction in the etalon planar view shown in FIG. 2 are formed may be employed. In this case, one of the two second displacement electrode pads 542B may be used as a voltage application terminal for applying a voltage to the second displacement electrode 542 and the other may be used as a charge detection terminal for detecting a charge retained by the second displacement electrode 542.

Here, this second displacement electrode 542 and the above-mentioned first displacement electrode 541 constitute the electrostatic actuator 54 which is the variable section according to the invention.

In the etalon 5, by applying a given voltage to the electrostatic actuator 54, an electrostatic attractive force is generated between the first displacement electrode 541 and the second displacement electrode 542. By this electrostatic attractive force, the movable section 521 is moved along the thickness direction of the substrate so as to adjust the inter-mirror gap G, and light to be dispersed can be selected from the light to be tested.

Further, the movable mirror 57 is provided on the lower surface of the second layer 530 at a position corresponding to the movable section 521 of the first layer 520 (in FIG. 3, on the lower side of the movable section 521 sandwiching the second layer 530) facing the fixed mirror 56 of the first substrate 51. In the etalon planar view, the movable mirror 57 is provided at a position overlapping with the movable section 521. Further, in the etalon 5, the inter-mirror gap G between the movable mirror 57 and the fixed mirror 56 is set to 450 nm in an initial state.

Here, as the movable mirror 57, a mirror having the same configuration as that of the above-mentioned fixed mirror 56, and in the etalon 5, an AgC single-layer mirror is used. Further, the AgC single-layer mirror is formed to a thickness of, for example, 0.03 μm.

As described above, the bonding layer 550 bonds the first layer 520 to the second layer 530 so as to increase the bonding strength between the two layers and has an optically transmissive property. In the etalon 5, a part of the bonding layer 550 is provided also in a region overlapping with the support section 531 (support section region 524) in the etalon planar view. Therefore, as the support section 531 bends when adjusting the inter-mirror gap G, also a partial region of the bonding layer 550 bends.

In the etalon 5, the bonding layer 550 is formed of an adhesive. The adhesive may be any as long as it can bond the first layer 520 to the second layer 530 and has an optically transmissive property. In the etalon 5, the first layer 520 and the second layer 530 are each formed of a glass base material, and therefore, an adhesive capable of bonding glass members to each other may be used, and for example, an epoxy resin or an amorphous fluororesin is preferred. In the case where the bonding layer 550 is formed of an epoxy resin or an amorphous fluororesin, when the glass base material is processed by wet etching with hydrofluoric acid or the like, the bonding layer 550 functions as an etching stopping layer and can prevent overetching.

Further, the bonding layer 550 is preferably formed to have a uniform thickness, and, for example, it is formed to a thickness of 1 μm.

Incidentally, to the support section region 524, the first layer 520 is not laminated, and the thickness of the support section 531 is 50 μm. Meanwhile, the thickness of the bonding layer 550 is 1 μm, and therefore, the thickness of the bonding layer 550 has almost no effect on the function of the support section 531 as a diaphragm.

3-2. Configuration of Voltage Controlling Unit

The voltage controlling unit 6 constitutes the wavelength variable interference filter according to the invention along with the above-mentioned etalon 5. This voltage controlling unit 6 controls a voltage to be applied to the first displacement electrode 541 and the second displacement electrode 542 of the electrostatic actuator 54 on the basis of a control signal input from the controlling device 4.

4. Configuration of Controlling Device

The controlling device 4 controls the overall operation of the colorimetric module 1.

As the controlling device 4, for example, a general-purpose personal computer or a personal digital assistance can be used, and also a dedicated computer for colorimetry or the like can be used.

The controlling device 4 is provided with a light source controlling section 41, a colorimetric sensor controlling section 42, and a colorimetric processing section 43, and the like as shown in FIG. 1.

The light source controlling section 41 is connected to the light source device 2. The light source controlling section 41 outputs a given control signal to the light source device 2 on the basis of, for example, a setting input by a user and allows the light source device 2 to emit white light of a given brightness.

The colorimetric sensor controlling section 42 is connected to the colorimetric sensor 3. The colorimetric sensor controlling section 42 sets the wavelength of light to be received by the colorimetric sensor 3 on the basis of, for example, a setting input by a user and outputs a control signal that the amount of received light of this wavelength is detected to the colorimetric sensor 3. In this manner, the voltage controlling unit 6 of the colorimetric sensor 3 sets a voltage to be applied to the electrostatic actuator 54 so that only light of a wavelength desired by the user is transmitted on the basis of the control signal.

5. Process for Producing Etalon

Subsequently, a process for producing the above-mentioned etalon 5 will be described with reference to the accompanying drawings.

5-1. Production of First Substrate

Figure 4A:
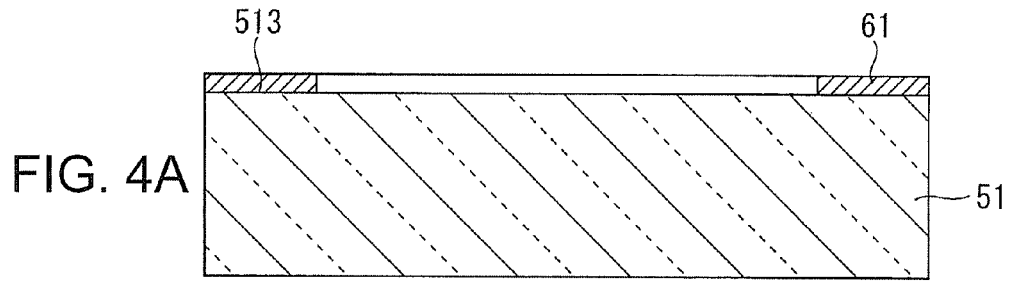
FIGS. 4A to 4E are views showing an outline of a process for producing a first substrate in the production of the etalon according to the embodiment.
Figure 4B:
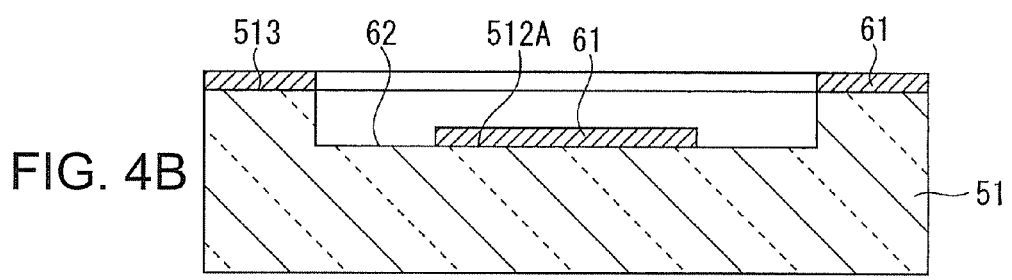
Figure 4C:
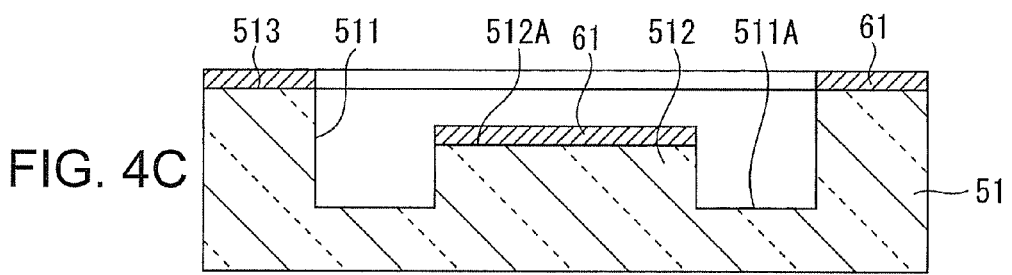
Figure 4D:
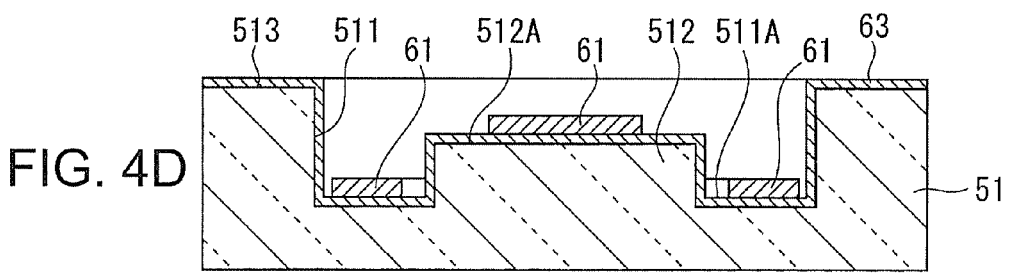
Figure 4E:
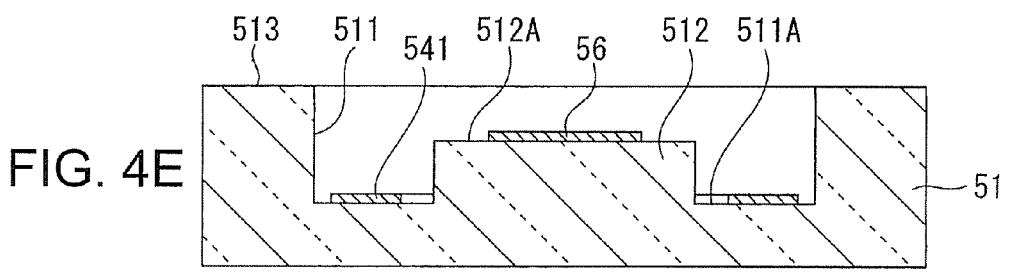

FIGS. 4A to 4E are views showing an outline of a process for producing a first substrate 51 of an etalon 5; FIG. 4A is a schematic view showing a resist forming step of forming a resist for forming a mirror fixing surface 512A on the first substrate 51; FIG. 4B is a schematic view showing a first groove forming step of forming the mirror fixing surface 512A; FIG. 4C is a schematic view showing a second groove forming step of forming an electrode fixing surface 511A; FIG. 4D is a schematic view showing an AgC forming step of forming an AgC layer; and FIG. 4E is a schematic view showing an AgC removing step.

In order to produce the first substrate 51, first, as shown in FIG. 4A, a resist 61 is formed on a glass base material which is a material for producing the first substrate 51 (a resist forming step), and as shown in FIG. 4B, a first groove 62 including a mirror fixing surface 512A is formed (a first groove forming step).

Specifically, in the resist forming step, the resist 61 is formed on a bonding surface 513. Then, in the first groove forming step, a portion other than the bonding surface 513 on which the resist 61 is not formed is isotropically etched, thereby forming the first groove 62 including the mirror fixing surface 512A.

After forming the first groove 62, as shown in FIG. 4C, a resist 61 is formed in a region where the mirror fixing surface 512A is formed in this first groove 62, and then, isotropic etching is further performed (a second groove forming step). In this manner, an electrode forming groove 511, an electrode fixing surface 511A, and a mirror fixing section 512 are formed.

Thereafter, as shown in FIG. 4D, the resist 61 on the first substrate 51 is removed, and an AgC thin film 63 is formed on a surface facing a second substrate 52 to a thickness of, for example, 30 nm (an AgC forming step). Further, in the AgC forming step, a resist 61 is formed in a region where the fixed mirror 56 is formed and a region where a first displacement electrode 541 is formed on the formed AgC thin film 63.

Then, by removing the AgC thin film 63 in the region where the resist 61 is not formed, the fixed mirror 56 and the first displacement electrode 541 are formed as shown in FIG. 4E (an AgC removing step).

As described above, the first substrate 51 is formed.

5-2. Production of Second Substrate

Subsequently, a process for producing a second substrate 52 will be described.

FIGS. 5A to 5C and 6D to 6G are views showing an outline of a process for producing a second substrate.

Figure 5A:
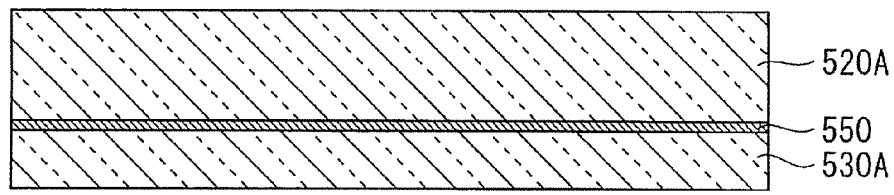
FIGS. 5A to 5C are views showing an outline of a part of a process for producing a second substrate in the production of the etalon according to the embodiment.
Figure 5B:
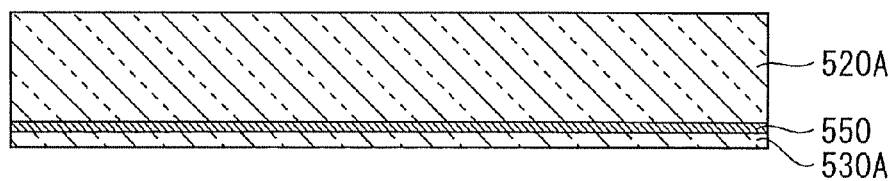
Figure 5C:
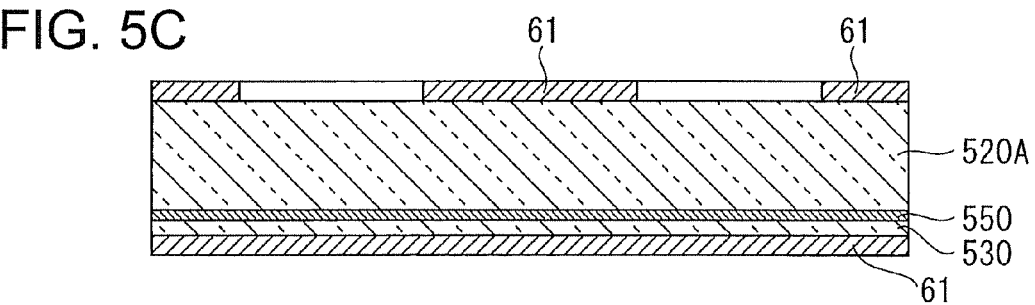

FIG. 5A is a schematic view showing a laminating step of laminating and bonding a first layer base material 520A to a second layer base material 530A; FIG. 5B is a schematic view showing a second layer forming step of processing the second layer base material 530A such that the thickness of the second layer base material 530A is reduced to the thickness of a support section 531; and FIG. 5C is a schematic view showing a resist forming step of forming a resist for forming a movable section 521 and a shoulder section 522.

Figure 6D:
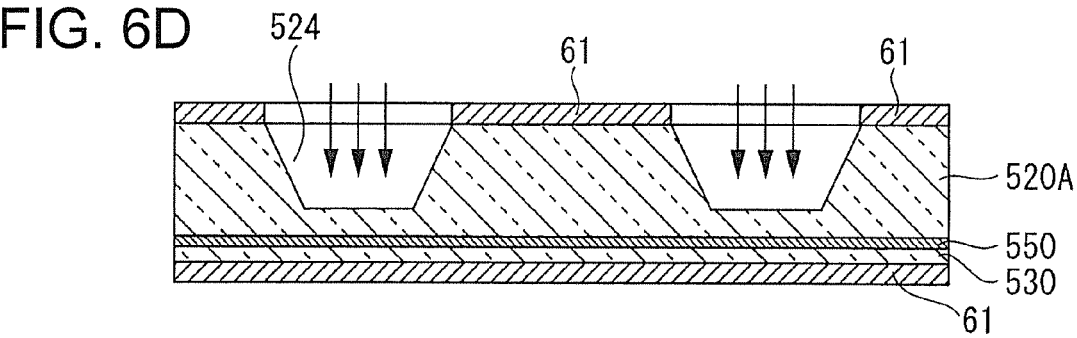
FIGS. 6D to 6G are views showing an outline of a process for producing a second substrate in the production of the etalon according to the embodiment continued from FIGS. 5A to 5C.
Figure 6E:
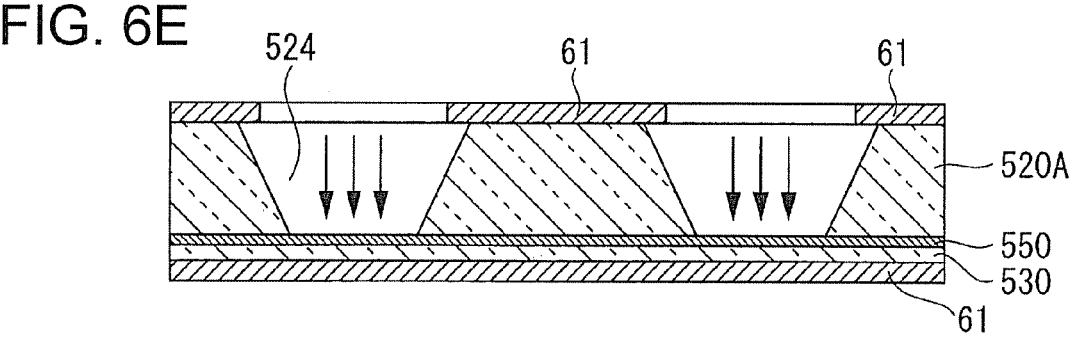
Figure 6F:
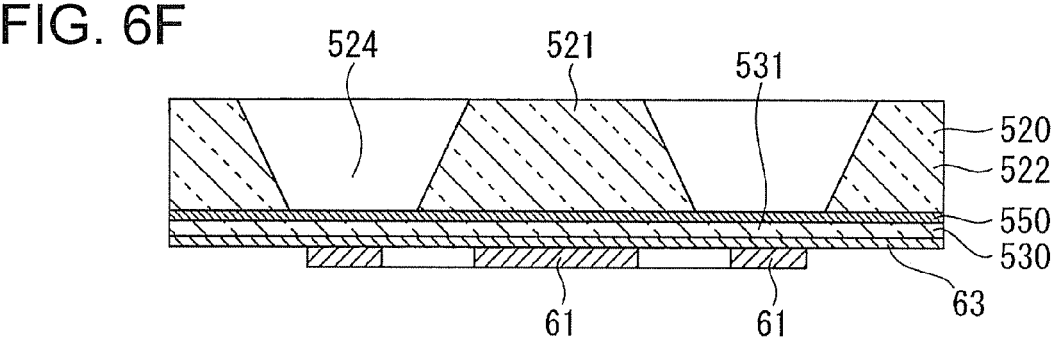
Figure 6G:
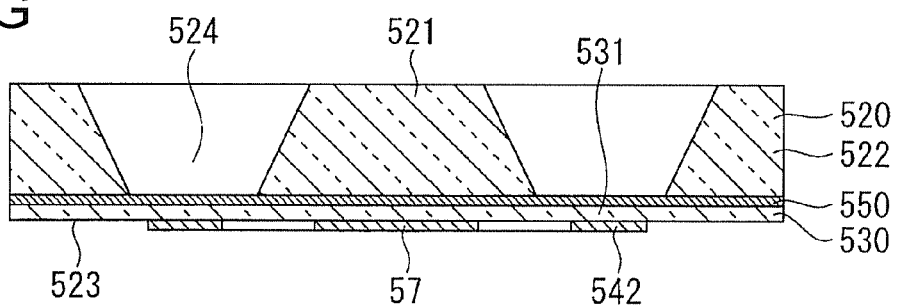

FIG. 6D is a schematic view showing the former half of a first layer forming step of excavating the first layer base material 520A by blasting; FIG. 6E is a schematic view showing the latter half of the first layer forming step of removing the first layer base material 520A by etching continued from the former half of the first layer forming step; FIG. 6F is a schematic view showing a step of forming a resist on an AgC thin film; and FIG. 6G is a schematic view showing a step of forming a movable mirror 57 and a second displacement electrode 542.

In the production of the second substrate 52, first, as shown in FIG. 5A, a first layer base material 520A (glass base material) for forming a first layer 520 which constitutes the second substrate 52 and a second layer base material 530A (glass base material) for forming a second layer 530 which constitutes the second substrate 52 are laminated and bonded to each other through a bonding layer 550 (a laminating step). In the second substrate 52, an adhesive is uniformly applied by spin coating or the like to one surface of at least one of the first layer base material 520A and the second layer base material 530A, and the base materials 520A and 530A are bonded to each other such that the thickness of the bonding layer 550 is uniform, thereby forming a laminated body. Incidentally, in the production of the etalon 5, the bonding layer 550 is formed of an adhesive containing an epoxy resin or an amorphous fluororesin.

Subsequently, as shown in FIG. 5B, the second layer base material 530A is processed such that the thickness of the second layer base material 530A is reduced to a desired thickness of a support section 531. Here, the second layer base material 530A is isotropically etched to reduce the thickness thereof, whereby the second layer 530 in a plate shape having the support section 531 with a desired thickness is formed (a second layer forming step). Incidentally, when etching the second layer base material 530A, a resist (not shown) may be formed on the surface of the first layer base material 520A so as not to etch the first layer base material 520A. As a resist material, a material having etching resistance is preferred.

Thereafter, as shown in FIG. 5C, a resist 61 is formed in corresponding regions where a movable section 521 and a shoulder section 522 of the first layer base material 520A, a support section region 524, and a bonding surface 523 (the lower surface side of the second layer base material 530A) of the second substrate 52 are formed (a resist forming step).

Then, as shown in FIG. 6D, regions other than the regions where the resist 61 has been formed on the first layer base material 520A are excavated by blasting (the former half of the first layer forming step). Here, blasting is stopped before the excavation reaches the bonding layer 550. As a guide for the depth of the excavation by blasting, about ½ to ¾ of the thickness of the first layer base material 520A is used, however, excavation may be further performed as long as the excavation does not reach the bonding layer 550.

Further, in order to prevent the bonding layer 550 from being excavated, the blast intensity may be set to a relatively high value during the period from when the excavation is started from the surface side of the first layer base material 520A (an initial excavation stage) until the excavation comes close to the bonding layer 550, and the blast intensity may be set to a relatively low value when the excavation comes close to the bonding layer 550.

Incidentally, examples of the blasting method include sand blasting in which excavation is performed by blowing alumina fine particles, and wet blasting in which excavation is performed by blowing slurry obtained by uniformly mixing an abrasive and a liquid.

Subsequently, as shown in FIG. 6E, after blasting (the former half of the first layer forming step), the first layer base material 520A is etched so as to remove the first layer base material 520A in the support section region 524 until the etching reaches the bonding layer 550, whereby the movable section 521 and the shoulder section 522 are formed (the latter half of the first layer forming step). By removing the first layer base material 520A by etching the regions where the resist 61 is not formed as described above, the thickness of a region corresponding to the support section 531 of the second layer 530 becomes the sum of the thickness of the second layer 530 and the thickness of the bonding layer 550.

Examples of the etching method include wet etching and dry etching. Incidentally, in the production of the etalon 5, the first layer base material 520A is a glass base material, and therefore, the first layer base material 520A can be etched by wet etching with hydrofluoric acid. As described above, the bonding layer 550 is formed of an epoxy resin or an amorphous fluororesin having resistance to hydrofluoric acid, and therefore, the second layer 530 can be prevented from being etched during etching. That is, the bonding layer 550 functions as an etching stopping layer.

Thereafter, the resist 61 formed on the first layer base material 520A and the second layer base material 530A is removed, and as shown in FIG. 6F, an AgC thin film 63 is formed to a thickness of, for example, 30 nm on the surface (lower surface of the second layer 530) facing the first substrate 51 in the same manner as in the production of the first substrate 51 (a second AgC forming step). Further, as shown in FIG. 6F, a resist 61 is formed in regions where a movable mirror 57 and a second displacement electrode 542 are formed on the formed AgC thin film 63.

Then, by removing the AgC thin film 63 in the regions where the resist 61 is not formed, the movable mirror 57 and the second displacement electrode 542 are formed as shown in FIG. 4G (an AgC removing step).

5-3. Production of Etalon

Subsequently, the production of the etalon 5 using the first substrate 51 and the second substrate 52 produced as described above will be described.

In the production of the etalon 5, a bonding step of bonding the first substrate 51 to the second substrate 52 is performed. In the bonding step, a plasma-polymerized film 58 is formed on bonding surfaces 513 and 523, respectively, and the first substrate 51 and the second substrate 52 are bonded to each other by bonding the plasma-polymerized films 58 formed on the bonding surfaces 513 and 523.

6. Effect of First Embodiment

In the etalon 5 according to the first embodiment, a portion of the bonding layer 550 is laminated on the support section 531 of the second layer 530, but the first layer 520 is not laminated to the support section region 524, and therefore, the thickness of the support section 531 is determined by the thickness of the second layer 530. Here, the second layer 530 is formed in a plate shape with a uniform thickness, and therefore, the support section 531 also has a uniform thickness. Accordingly, when the movable section 521 is displaced, a bending stress is uniformly applied to the support section 531, and therefore, the support section 531 can be bent in a well-balanced manner and the movable section 521 can be displaced while maintaining the state where the fixed mirror 56 and the movable mirror 57 are in parallel to each other. Consequently, even when the movable section 521 is displaced, a disadvantage such as a decrease in wavelength resolution of transmitted light does not occur and high spectroscopic accuracy can be maintained.

Further, in the production of the second substrate 52, the first layer base material 520A in the support section region 524 is removed, thereby forming the first layer 520 having the movable section 521 and the shoulder section 522. Accordingly, the first layer base material 520A does not remain on the support section 531 of the second layer 530, and therefore, the thickness of the support section 531 does not vary and can be made uniform.

Further, the bonding layer 550 is formed of an epoxy resin or an amorphous fluororesin which can firmly bond glass members. Therefore, the bonding strength between the first layer 520 and the second layer 530 is increased, and peeling of the movable section 521 can be prevented when, for example, the first substrate 51 and the second substrate 52 are bonded through a plasma-polymerized film 58 or when the second layer 530 bends.

In addition, the epoxy resin or the amorphous fluororesin has resistance to hydrofluoric acid, and therefore, when performing etching in the first layer forming step, the second layer 530 can be prevented from being etched. That is, the bonding layer 550 functions as an etching stopping layer. As a result, when etching a region overlapping with the support section of the first layer base material 520A, the first layer base material 520A on the support section 531 can be removed reliably and easily, and therefore, the production process can be simplified.

Further, in the former half of the first layer forming step, blasting by which the speed of removing the first layer base material 520A is higher than the case of using etching is employed, and the first layer base material 520A is excavated until the base material has a desired thickness (before the excavation reaches the bonding layer 550). Therefore, the time for forming the first layer 520 can be reduced as compared with the case where the first layer base material 520A is removed only by etching.

Further, in the process for producing the etalon 5 according to this embodiment, the first layer base material 520A can be excavated rapidly by blasting, and therefore, even if the thickness of the first layer 520 is increased to 500 μm to 1 mm, the etalon 5 having a movable section with a large thickness can be produced without decreasing the production efficiency. In the thus produced etalon 5, the movable mirror can be more effectively prevented from bending. Incidentally, the thickness of the second substrate in the related art was about 200 μm because the thickness thereof could not be increased from the viewpoint of the production efficiency, and therefore, the thickness of the movable section was also about 200 μm.

Further, in the latter half of the first layer forming step, after removing the first layer base material 520A halfway by blasting, the rest of the first layer base material 520A is removed by etching. If all of the first layer base material 520A is tried to be removed by blasting, for example, when the timing of stopping the blasting is late, the bonding layer 550, and moreover the support section 531 located on the lower side of the bonding layer 550 may be excavated and the thickness of the bonding layer 550 or the support section 531 may vary. Meanwhile, when the timing of stopping the blasting is early, the first layer base material 520A remains on the support section 531 and the bonding layer 550, and due to the residue, a bending stress is not uniformly applied to the support section 531, and therefore, the support section 531 may not be able to be bent in a well-balanced manner.

On the other hand, in the etalon 5, after a portion of the first layer base material 520A is rapidly removed by blasting, the rest is etched, and therefore, etching accuracy can be increased, and the first layer base material 520A can be prevented from remaining and the second layer base material 530A can be prevented from being excavated.

Other Embodiments

The invention is not limited to the above-mentioned embodiments, and modifications, improvements, and the like within the scope capable of achieving the objects of the invention are included in the invention.

For example, the bonding between the first substrate 51 and the second substrate 52 may be achieved by bonding using a bonding member such as an adhesive or by activated bonding (optical contact) at normal temperature. In the case where activated bonding at normal temperature is employed, both substrates 51 and 52 are placed in a vacuum chamber, the bonding surfaces 513 and 523 are activated by ion beam irradiation or plasma treatment under vacuum. Then, the activated bonding surfaces 513 and 523 are overlaid with each other and then, a weight is applied in the thickness direction of the first substrate 51 and the second substrate 52, whereby the first substrate 51 and the second substrate 52 are bonded to each other.

Further, in the above-mentioned embodiment, the bonding between the first layer 520 and the second layer 530 of the second substrate 52 is also performed using an adhesive, however, the invention is not limited thereto, and bonding through a plasma-polymerized film or activated bonding at normal temperature may be performed.

In addition, in the above-mentioned embodiment, the bonding layer 550 is formed on the support section 531, however, the bonding layer 550 may not be formed, and the support section 531 having a uniform thickness may be formed only of the second layer 530.

Example 1

For example, in the case where the first layer 520 and the second layer 530 are bonded through the bonding layer 550 in the same manner as in the above-mentioned embodiment, a configuration in which not only the first layer base material 520A in the support section region 524, but also the bonding layer 550 in a region corresponding to the support section region 524 is removed may be employed. In this case, the movable section 521 and the shoulder section 522 are bonded to the second layer 530 through the bonding layer 550, however, the bonding layer 550 is not left on the support section 531, and therefore, the support section 531 having a uniform thickness is exposed in the etalon planar view.

Accordingly, even if the excavation goes through the first layer base material 520A by the above-mentioned blasting and the bonding layer 550 is partially excavated so that a variation in the thickness of the bonding layer 550 is caused, a diaphragm which functions only with the support section 531 having a uniform thickness can be formed by removing the bonding layer 550.

Example 2

For example, a configuration in which the first layer 520 and the second layer 530 are laminated and bonded to each other without interposing the bonding layer 550 may be employed. In this case, when the first layer base material 520A and the second layer base material 530A are bonded to each other by the above-mentioned activated bonding at normal temperature, and then, the first layer base material 520A in the support section region 524 is removed, the support section 531 having a uniform thickness is exposed in the etalon planar view. Accordingly, a diaphragm which functions only with the support section 531 having a uniform thickness can be formed.

Further, the thickness of the second layer 530 may be the same as that of the support section 531 throughout the layer, or the thickness of a portion of the second layer 530 other than the support section 531 may be made larger than that of the support section 531. That is, it is not that the entire surface of the second layer base material 530A is etched so that the second layer 530 has a uniform thickness, but that a region where the support section 531 is formed may be selectively etched so that the second layer 530 has two or more step differences in thickness at the support section 531 and the other portions.

Further, the variable section is not limited to the electrostatic actuator 54 and may be any as long as it can adjust the inter-mirror gap G. For example, a method of bending the second substrate 52 by a piezoelectric element may be employed.

Further, in the above-mentioned embodiment, a production process using blasting and etching in combination in the first layer forming step is described, however, the invention is not limited thereto.

For example, the first layer base material 520A may be removed only by etching. Even in this case, by forming the bonding layer 550 having etching resistance, the bonding layer 550 functions as an etching stopping layer, and therefore, the thickness of the support section 531 can be prevented from varying.

On the other hand, the first layer base material 520A may be removed only by blasting. In this case, the bonding layer 550 is formed of a material which can be removed by etching or the like in advance, and blasting is stopped before the blasting reaches the support section 531 by excavating and boring the bonding layer 550. Thereafter, by removing the bonding layer 550 through etching or the like, it is possible to allow the support section 531 having a uniform thickness to function as a diaphragm. In this case, by making the thickness of the bonding layer 550 larger than that in the above-mentioned embodiment, the support section 531 can be reliably prevented from being excavated by blasting.

The specific configuration and procedure when implementing the invention can be appropriately changed to other configuration or the like within the scope capable of achieving the objects of the invention.

The entire disclosure of Japanese Patent Application No. 2010-027322, filed Feb. 10, 2010 is expressly incorporated by reference herein.

What is claimed is:

1. A wavelength variable interference filter, comprising:
a first substrate which has a light transmissive property;
a second substrate which has a light transmissive property and is disposed to face one surface of the first substrate and is bonded thereto via a first layer;
a first reflection film which is provided on the first substrate;
an electrode which is provided on the first substrate, the electrode being located adjacent to the first reflection film;
a second reflection film which is provided on the first layer and faces the first reflection film with a gap interposed therebetween; and
a variable section which varies the gap; wherein
the first layer is formed on an entire surface of the second substrate,
the first layer located in first, second and third areas respectively corresponds to an area where the first and second reflection films are provided, a peripheral of the first substrate and an area between the first area and the second area in the plan view,
a first total thickness of the second substrate and the first layer in the third area is thinner than each of second and third total thicknesses of the second substrate and the first layer in the first and second areas, respectively, and
the second and third total thicknesses are the same.

2. The wavelength variable interference filter according to claim 1, wherein
the first layer and the second layer are formed of glass and bonded to each other through a bonding layer; and
the bonding layer is formed of an epoxy resin or an amorphous fluororesin.

3. The wavelength variable interference filter according to claim 2, wherein
the thickness of the first layer is in a range of 500 μm to 1 mm.

4. The wavelength variable interference filter according to claim 1, wherein
the thickness of the first layer is in a range of 500 μm to 1 mm.

5. An optical sensor, comprising:
a wavelength variable interference filter including:
a first substrate which has a light transmissive property;
a second substrate which has a light transmissive property and is disposed to face one surface of the first substrate and is bonded thereto via a first layer;
a first reflection film which is provided on the first substrate;
an electrode which is provided on the first substrate, the electrode being located adjacent to the first reflection film;
a second reflection film which is provided on the first layer and faces the first reflection film with a gap interposed therebetween; and
a variable section which varies the gap; and
a light receiving unit configured to receive light that is transmitted from a light source and that passes through the wavelength variable interference filter, wherein
the first layer is formed on an entire surface of the second substrate,
the first layer located in first, second and third areas respectively corresponds to an area where the first and second reflection films are provided, a peripheral of the first substrate and an area between the first area and the second area in the plan view,
a first total thickness of the second substrate and the first layer in the third area is thinner than each of second and third total thicknesses of the second substrate and the first layer in the first and second areas, respectively, and
the second and third total thicknesses are the same.

6. The optical sensor according to claim 5, wherein
the thickness of the first layer is in a range of 500 μm to 1 mm.

7. An analyzer including an optical sensor, the analyzer comprising:
a light source that emits light;
a wavelength variable interference filter that receives the light, the wavelength variable interference filter including:
a first substrate which has a light transmissive property;
a second substrate which has a light transmissive property and is disposed to face one surface of the first substrate and is bonded thereto via a first layer;
a first reflection film which is provided on the first substrate;
an electrode which is provided on the first substrate, the electrode being located adjacent to the first reflection film;
a second reflection film which is provided on the first layer and faces the first reflection film with a gap interposed therebetween; and
a variable section which varies the gap; and a light receiving unit configured to receive the light that passes through the wavelength variable interference filter, wherein the first layer is formed on an entire surface of the second substrate, the first layer located in first, second and third areas respectively corresponds to an area where the first and second reflection films are provided, a peripheral of the first substrate and an area between the first area and the second area in the plan view, a first total thickness of the second substrate and the first layer in the third area is thinner than each of second and third total thicknesses of the second substrate and the first layer in the first and second areas, respectively, and the second and third total thicknesses are the same.

8. The analyzer according to claim 7, wherein the thickness of the first layer is in a range of 500 µm to 1 mm.

* * * * *